March 15, 1960     H. W. ROCKWELL     2,928,683
WEIGHT TRANSFERRING SUPPORTING STRUCTURE
Filed June 2, 1958     2 Sheets-Sheet 1
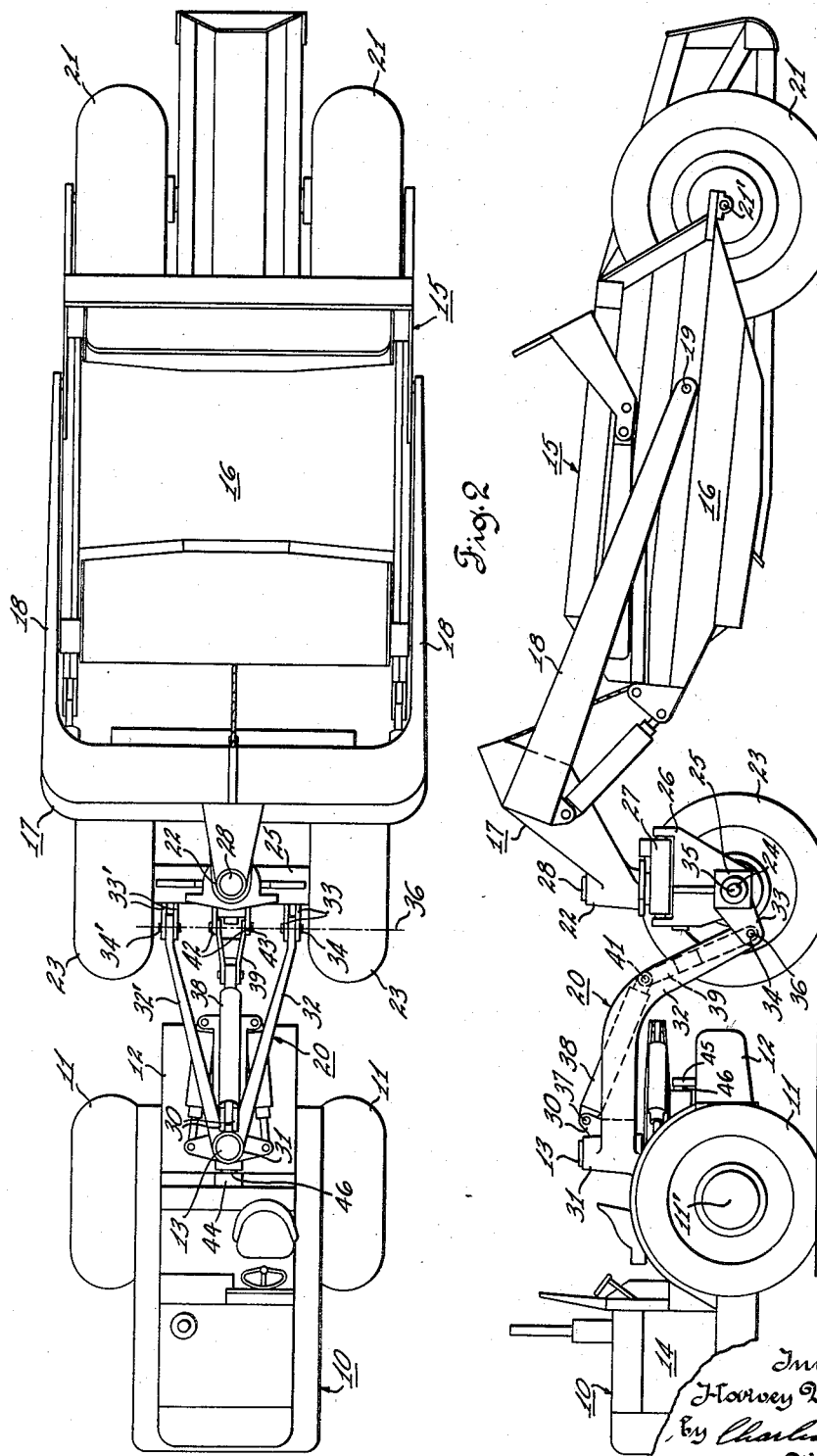

United States Patent Office 2,928,683
Patented Mar. 15, 1960

2,928,683

WEIGHT TRANSFERRING SUPPORTING STRUCTURE

Harvey W. Rockwell, Cedar Rapids, Iowa, assignor to Allis-Chalmers Manufacturing Company, Milwaukee, Wis.

Application June 2, 1958, Serial No. 739,020

8 Claims. (Cl. 280—406)

This invention relates to earth moving vehicles and more particularly to an improved weight transferring supporting structure to be utilized intermediate tractor and trailer units.

This invention is to be used with vehicles employed in road building operations wherein at various times the vehicles are operated over level hard surfaced terrain and at other times over rough terrain wherein varying surface contours and soil conditions present correspondingly varying load and traction problems.

It has been found desirable in the earth moving industry to increase the capacity of the earth mover. It is advantageous to increase the capacity of the earth mover by increasing the size of the trailer unit without increasing the size of the tractor unit. Although the invention contemplates use with any type tractor unit, the invention will herein be described in conjunction with a two wheel tractor.

It is a general object of my herein described invention to use a relatively small two wheel tractor unit with an oversized trailer unit. This gives rise to a problem in that when the earth mover is fully loaded and traveling at high speeds the enlarged capacity trailer places a sustained additional load on the tractor which adversely affects the life of the axle, axle bearings and axle housing with entailing danger of failure of parts.

To achieve safe loading of the tractor axle when the earth mover is fully loaded and traveling at high speeds I found it desirable to introduce a load supporting structure having a pair of load bearing wheels mounted intermediate the tractor and trailer units. Since traction is a product of weight on the driving wheels and the traction factor of the tires with the ground, the removal of weight from the tractor axle to permit safe operation of the earth mover when fully loaded and operating at high speeds presents a problem of obtaining a sufficient amount of traction when the earth mover is operating over terrain having varying contours and soil conditions and particularly during loading when a scraper unit is employed as the trailer. I found it desirable to provide a weight transferring means that is capable of selectively transferring weight to the tractor unit when additional traction is required and in which the weight transferring means can be made inactive during other periods of operation so as not to interfere with the operation of the earth mover when weight transfer is not being utilized.

Previously constructed weight transferring means have included provision for a hydraulic ram to be utilized for transferring weight to the tractor unit at certain periods of operation when additional traction is needed and during other periods of operation the ram is placed in a float condition so that the ram will not interfere with the operation of the earth mover when weight transfer is not being utilized. This provision has contributed to increasing the traction of the earth mover; however, the ram was so positioned that when the earth mover was operating with sufficient traction over bumpy terrain and at moderate to high speeds as when on a return trip with the trailer unit empty, with the hydraulic ram in the float position, the piston would freely reciprocate in the cylinder as the tractor and trailer units oscillated relative to one another about their transverse hitch axis. This repetitious reciprocating of the piston adversely affects the wall, piston, rod and packing of the ram. Also, when the ram is in the float position and the tractor and trailer units are oscillating relative to one another when traveling over bumpy terrain a sudden build-up of pressure in the ram may occur which would cause the ram to interfere with the operation of the earth mover and cause undesirable heating of the oil.

Another means for overcoming the lack of traction includes the addition of weight to the tractor unit. This provision for additional weight to be attached to the tractor unit presents the problem of overloading the tractor thereby overstressing various load supporting parts for sustained periods. Also, the use of weights would entail a considerable loss of operating time for mounting and dismounting the weights as needed.

As hereinbefore mentioned sustained additional loads on the tractor when the earth mover is operating fully loaded and at high speed, subjects the tractor load supporting parts to excessive stresses. However, ordinarily during the operation of the earth mover, weight transfer would be used at slow speeds and when additional traction is required. Thus, during weight transfer static loads would constitute most of the load placed upon the tractor's load supporting parts and these parts would not be in danger of failing due to excessive stresses which would occur if the parts were simultaneously subjected to dynamic loading caused by bouncing over rough terrain and the like.

Therefore it is an object of my invention to provide a wheeled load supporting structure to be used intermediate tractor and trailer units respectively which will carry the load which would otherwise be carried by the tractor unit.

It is a further object of my invention to provide a wheeled load supporting structure to be used intermediate tractor and trailer units respectively, wherein power means are selectively operable to transfer weight from the load supporting structure to the tractor when the vehicle is operating at slow speeds thereby placing static loads upon the tractor unit.

It is a further object of my invention to provide a wheeled load supporting structure to be used intermediate a tractor unit and a trailer unit respectively, having a hydraulic ram which when actuated transfers a portion of the weight from the load supporting structure to the tractor unit.

It is a further object of my invention to provide a wheeled load supporting structure to be used intermediate tractor and trailer units respectively, wherein when the hydraulic ram is contracted the piston will not reciprocate during relative oscillation of the tractor and trailer units.

It is a further object of my invention to provide a wheeled load supporting structure to be used intermediate a single axle tractor unit and wheeled trailer unit respectively which will carry the load which would otherwise be carried by the tractor unit.

It is a further object of my invention to provide a wheeled load supporting structure to be used intermediate a single axle tractor unit and wheeled trailer unit respectively, wherein power means are selectively operable to transfer weight from the load supporting structure to the tractor when the vehicle is operating at slow speeds thereby placing static loads upon the tractor unit.

It is a further object of my invention to provide a wheeled load supporting structure to be used intermediate a single axle tractor unit and wheeled trailer unit respectively, having a hydraulic ram which when actuated transfers a portion of the weight from the load supporting structure to the tractor unit.

It is a further object of my invention to provide a wheeled load supporting structure to be used intermediate a single axle tractor unit and wheeled trailer unit respectively, wherein when the hydraulic ram is contracted the piston will not reciprocate during relative oscillation of the tractor and trailer units.

These and other objects and advantages of this invention will be evident when the following description is read in conjunction with the accompanying drawings, in which:

Fig. 1 is a side view of a unit comprising tractor and trailer units and embodying the invention;

Fig. 2 is a plane view of the same as shown in Fig. 1;

Fig. 13 is an enlarged side view, partly in section, of the rearward portion of the tractor unit, the embodied invention and the forward portion of the trailer unit.

Figure 3:
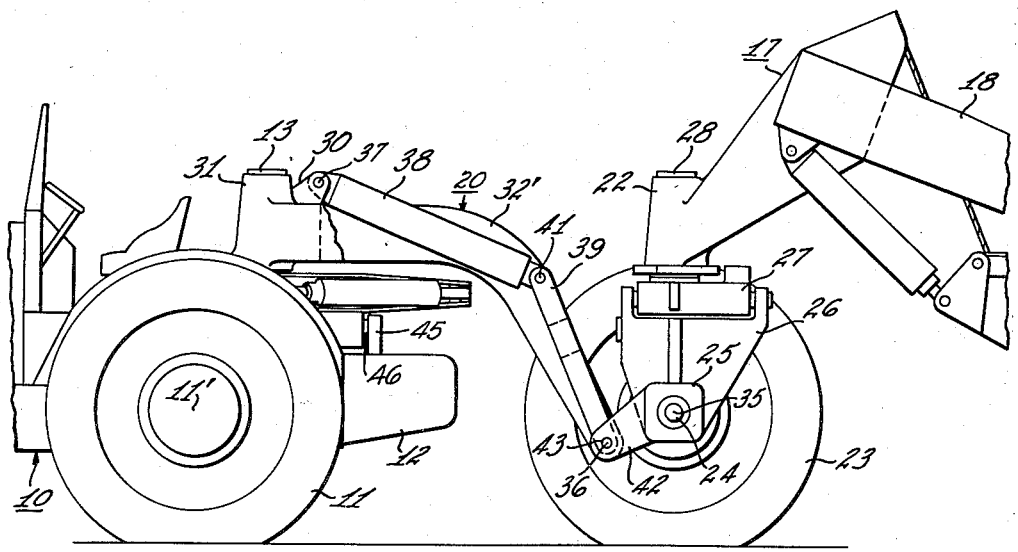

Referring to Fig. 1 this invention is embodied in a small size two wheel tractor 10 and an oversized two wheel trailer 15. The tractor 10 includes a pair of traction wheels 11, a main frame 12 and a hitch member 13. Hitch 13 is pivotally connected to main frame 12 at 44 (shown in Fig. 2) and 45 for rocking movement about the longitudinal pivot axis of pin 46. It will be readily apparent, however, that the connections at 44 and 45 are such that hitch member 13 is held rigidly against fore and aft pivotal movement with respect to the tractor main frame 12. The tractor is provided with an engine 14 supplying suitable power for towing the trailer 15.

The trailer 15 includes a bowl frame 16, a yoke 17 having a forward pedestal 22 and a pair of rearwardly extending side arms 18 pivotally connected by pins 19 to the bowl frame 16, and a pair of support wheels 21.

The attachment of the oversize trailer 15 to the relatively smaller size tractor 10 would place excessive stresses on the load supporting parts of the tractor 10. The subjection of the load supporting parts of the tractor 10 to excessive stresses is particularly detrimental to the life thereof when the vehicle is traveling over rough terrain which causes the earth mover to bounce on its inflated tires, thus placing dynamic loads on the load supporting parts of the tractor. A load supporting structure 20 is mounted intermediate the tractor and trailer units, and carries the load which would otherwise be carried by the load supporting parts of the tractor unit, thus providing a safe load on the tractor unit. The load supporting structure 20 includes a trailer hitch support 25 having stub axles 24 extending laterally therefrom and a pair of load supporting wheels 23 rotatably mounted on the stub axles 24. The trailer hitch support also includes a cradle 26 which supports a horizontal hitch 27. Connected to the horizontal hitch 27 and working with the latter is a vertical hitch 28. The pedestal 22 of trailer 15 is connected to vertical hitch 28 of the load supporting structure 20 in vertically rigid and horizontally swingable relationship. Although horizontal hitch 27 is rigidly held on structure 20 against fore and aft pivotal movement, it allows independent lateral pivoting of the trailer unit and thereby reduces strains on the earth mover and rough riding characteristics when the vehicle is operating over rough uneven terrain.

Figure 4:
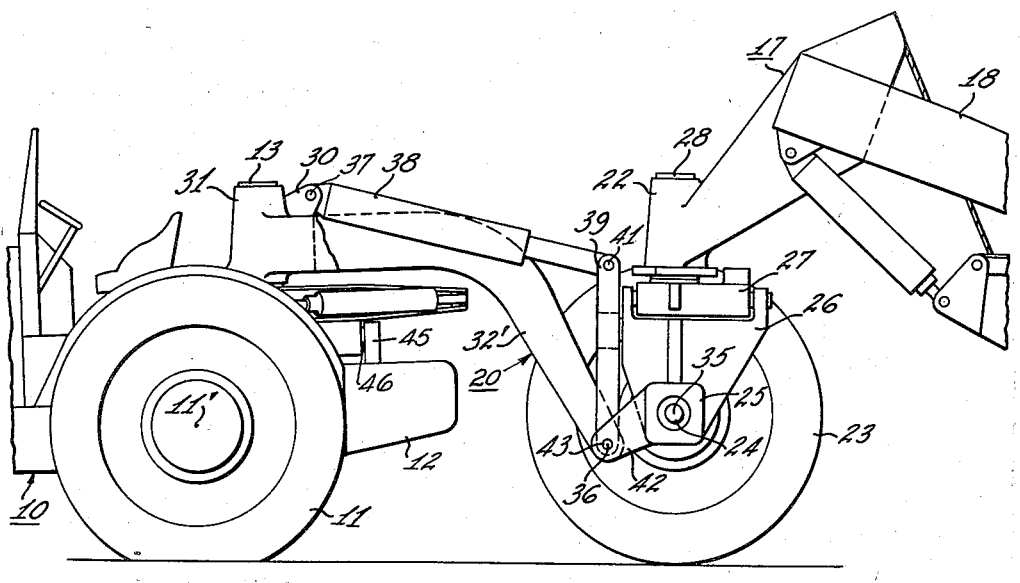
Fig. 4 is an enlarged side view, partly in section, of the rear portion of the tractor and the forward portion of the trailer with the embodied invention in a weight transferring position.

Referring also to Fig. 2, the tractor 10 is connected to the load supporting structure 20 in vertically rigid and horizontally swingable relation to one another by a fork frame having a pedestal portion 31 which is engaged with the hitch 13 of the tractor 10. Extending from the pedestal portion of the fork frame is a pair of branches 32 and 32'. The branches 32 and 32' are each pivotally connected to a pair of ears 33 and 33' respectively, on the trailer hitch support 25 by pins 34 and 34' respectively. The branches pivot about a transverse axis 36 which is spaced from, parallel with and below the axis 35 of wheels 23. Disposed between the branches 32 and 32' of the fork frame is a power means illustrated as a double acting hydraulic ram 38. The ram 38 is supplied with fluid pressure from any suitable source (not shown) and is controlled by the operator of the vehicle. The ram 38 is pivotally connected to extensions 30 of the pedestal portion 31 by a pin 37 and the opposite end of the ram 38 is pivotally connected to a lever arm 39 by a pin 41. When the ram is contracted it is in its nonweight transferring position and when expanded it is in its weight transferring position as shown in Fig. 4. The lever arm 39 is also disposed between branches 32 and 32' and is pivotally connected to ears 42 of the trailer hitch support 25 by a pin 43 for pivotal movement about the common transverse axis 36 from a nonabutting position corresponding to the nonweight transferring position of the hydraulic ram and to an abutting position with the cradle 26 corresponding to the weight transferring position of the ram 38.

The operation of the weight transferring supporting structure is illustrated in Figs. 1, 3 and 4. Referring now to Figs. 1 and 3 the load supporting structure is mounted intermediate the relatively small size tractor unit and the oversized trailer unit. With the load supporting structure 20 mounted the load which would otherwise be carried on the tractor's load supporting parts would thus be carried by the load supporting structure. This permits the earth mover to operate fully loaded and at high speeds without subjecting the tractor's load supporting parts to dynamic loads caused by the bouncing of the vehicle as it is operated over rough terrain. At this point of operation the ram has been contracted and is in its nonweight transferring position. The lever arm 39 is correspondingly in its nonabutting position in relation to the cradle 26. With the ram and the lever arm in their respective positions the weight transferring means is completely inactive. When the earth mover is traveling over terrain in which sufficient traction is being supplied, even though the tractor and trailer units are oscillating relative to one another, the ram will remain contracted and the parts of the ram will not be subjected to any reciprocating movement of the piston. Nor will a sudden bounce of the earth mover cause a sudden build-up of pressure in the ram thereby causing the ram to interfere with the operation of the earth mover.

Referring now to Fig. 4, when the tractor unit has insufficient traction due to insufficient weight on the traction wheels, the ram 38 is selectively supplied fluid pressure causing the ram to expand and moving the lever arm 39 to its abutting position with the cradle 26 corresponding to the ram's weight transferring position. As hereinbefore described the tractor and trailer units are each respectively connected to the load supporting structure in vertically rigid and horizontally swingable relation to the load supporting structure 20. Further extension of the hydraulic ram 38 is accommodated by counterclockwise rotation of the tractor 10 about its wheel axis 11' and by a clockwise rotation of the trailer unit about its wheel axis 21'.

This relative rotation of the tractor and trailer units about their axes 11' and 21' respectively tends to raise the load supporting structure vertically about axis 36 thereby reducing ground weight on the latter. This weight is transferred to the tractor and trailer units, with the majority of the weight being transferred to the tractor unit. Since traction is a product of weight on the driving wheels and the traction factor of the tires to the ground, the weight transferred to the tractor unit insures maximum traction for the tractor tires whenever such additional traction is required. Ordinarily, weight transfer takes place selectively at moderate speeds so that only static vertical loads would be imposed on the tractor's load supporting parts. Therefore the load transferred to the tractor unit permits development of a sufficient amount of traction to continue the effective operation of the earth mover, while maintaining a safe load on the load supporting parts of the tractor.

In accordance with my invention there is provided a load supporting structure positioned intermediate a relatively small size two wheel tractor unit and an oversized two wheel trailer unit which carries the load which would otherwise be placed on the tractor's load supporting parts. The mounting of the load supporting structure permits the earth mover to operate without subjecting the load supporting parts of the tractor unit to excessive stresses and thus endangering the safeness of the operation of the earth mover. Also, there is provided a weight transferring means selectively operable to transfer weight from the load supporting structure to the tractor unit when the earth mover becomes stalled due to the traction wheels of the tractor unit being unable to maintain a sufficient amount of traction to effectively operate the earth mover. The weight transferring means includes a hydraulic ram that is so positioned that the oscillation of the tractor and trailer units relative to one another will not have any adverse effects upon the ram's working parts as the vehicle is operated over bumpy terrain. Thus there is achieved a weight transferring means which is capable of selectively transferring a portion of the load carried by the load supporting structure to the tractor unit when additional traction is required for continued effective operation of the vehicle.

While only one particular embodiment of the applicant's invention has been described, it should be understood that the applicant's invention is not restricted thereto, that it is intended to cover all modifications of the invention which would be apparent to one skilled in the art that come within the scope of the appended claims.

What is claimed is:

1. An earth moving vehicle comprising: a two wheel tractor unit; a hitch member connected on said tractor unit for rocking movement about a longitudinal pivot axis; a wheel supported trailer unit; and a load supporting structure positioned intermediate said tractor and trailer units including a trailer hitch support, a pair of load bearing wheels rotatably mounted on said trailer hitch support, hitch means for connecting said trailer hitch support to said trailer unit so that the latter is held against pivotal fore and aft movement with respect to the hitch support but is horizontally swingable with respect to the hitch supoprt, a frame having one end pivotally connected in vertically rigid, horizontally swingable relation to the hitch member on said tractor unit and the other end of said frame being pivotally connected to said trailer hitch support for vertically swinging movement about a transverse axis, and power means disposed between and connected to said frame and trailer hitch support for pivoting the latter relative to said frame about said transverse axis, said power means being effective upon actuation to transfer weight from said load bearing wheels to said tractor and trailer units.

2. An earth moving vehicle comprising: a two wheel tractor unit; a hitch member connected on said tractor unit for rocking movement about a longitudinal pivot axis; a wheel supported trailer unit; and a load supporting structure positioned between said tractor and trailer units including a trailer hitch support, a pair of load bearing wheels rotatably mounted on said trailer hitch support, hitch means for connecting said trailer hitch support to said trailer unit so that the latter is held against fore and aft pivotal movement with respect to the hitch support but is horizontally swingable with respect to the hitch support, a frame having one end pivotally connected in vertically rigid, horizontally swingable relation to the hitch member on said tractor unit and the other end of said frame being pivotally connected to said trailer hitch support for vertically swinging movement about a transverse axis, a lever arm having one end pivotally connected to said trailer hitch support for pivotal movement to an abutting position with said trailer hitch support, and power means disposed between and connected to said frame and to said lever arm, said power means upon actuation moving said lever arm to said abutting position for pivoting said trailer hitch support relative to said frame about said transverse axis and being effective to transfer weight from said load bearing wheels to said tractor and trailer units.

3. An earth moving vehicle comprising: a two wheel tractor unit; a hitch member connected on said tractor unit for rocking movement about a longitudinal pivot axis; a wheel supported trailer unit; and a load supporting structure positioned intermediate said tractor and trailer units including a trailer hitch support, a pair of load bearing wheels rotatably mounted on said trailer hitch support, hitch means connecting said trailer hitch support to said trailer unit so that the latter is held against fore and aft pivotal movement with respect to the hitch support but is horizontally swingable with respect to the hitch support, a fork frame having a pedestal portion pivotally connected in vertically rigid, horizontally swingable relation to the hitch member on said tractor unit and having a pair of branches extending from said pedestal portion, said branches each pivotally connected to said trailer hitch support for vertical swinging movement about a transverse axis, and power means disposed between said branches and connected to said pedestal and trailer hitch support for pivoting the latter relative to said fork frame about said transverse axis, said power means being effective upon actuation to transfer weight from said load bearing wheels to said tractor and trailer units.

4. An earth moving vehicle comprising: a two wheel tractor unit; a hitch member connected on said tractor unit for rocking movement about a longitudinal pivot axis; a wheel supported trailer unit; and a load supporting structure positioned intermediate said tractor and trailer units including a trailer hitch support, a pair of load bearing wheels rotatably mounted on said trailer hitch support, hitch means connecting said trailer hitch support to said trailer unit so that the latter is held against fore and aft pivotal movement with respect to the hitch support but is horizontally swingable with respect to the hitch support, a fork frame having a pedestal portion pivotally connected in vertically rigid, horizontally swingable relation to the hitch member on said tractor unit and having a pair of branches extending from said pedestal portion, said branches each pivotally connected to said trailer hitch support for vertically swinging movement about a transverse axis, a lever arm disposed between said branches having one end pivotally connected to said trailer hitch support for pivotal movement to an abutting position with said trailer hitch support, and power means disposed between and connected to said pedestal and lever arm, said power means upon actuation moving said lever arm to said abutting position for pivoting said trailer hitch support relative to said fork frame about said transverse axis, and being effective to transfer weight from said load bearing wheels to said tractor and trailer units.

5. An earth moving vehicle comprising: a two wheel tractor unit; a hitch member connnected on said tractor unit for rocking movement about a longitudinal pivot axis; a wheel supported trailer unit; and a load supporting structure positioned intermediate said tractor and trailer units including a trailer hitch support, a pair of load bearing wheels rotatably mounted on said trailer hitch support, hitch means connecting said trailer hitch support to said trailer unit so that the latter is held against fore and aft pivotal movement with respect to the hitch support but is in horizontally swingable relationship with the hitch support, a fork frame having a pedestal pivotally connected in vertically rigid, horizontally swingable relation to the hitch member on said tractor unit and a pair of branches each pivotally connected to said trailer hitch support for vertically swinging movement about a transverse axis, a lever arm disposed between said branches having one end pivotally connected to said trailer hitch support for pivotal movement about said transverse axis to an abutting position with said trailer hitch support, and a hydraulic ram disposed between said branches having one end pivotally connected to said pedestal and its other end pivotally connected to said lever arm, said hydraulic ram upon actuation moving said lever arm to said abutting position for pivoting said trailer hitch support relative to said fork frame about said transverse axis and being effective to transfer weight from said load bearing wheels to said tractor and trailer units.

6. In an earth moving vehicle of the type having tractor and trailer units, a load supporting structure positioned intermediate said tractor and trailer units comprising: a trailer hitch support; a pair of load bearing wheels rotatably mounted on said trailer hitch support; hitch means connecting said trailer hitch suport to said trailer unit; a fork frame having a pedestal portion pivotally connected to said tractor unit for horizontally swinging movement relative to said tractor unit and having a pair of branches extending from said pedestal portion, said branches each are pivotally connected to said trailer hitch support for vertical swinging movement about a transverse axis; and power means disposed between said branches and connected to said pedestal and said trailer hitch support for pivoting said trailer hitch support relative to said fork frame about said transverse axis, said power means being effective upon actuation to transfer weight from said load bearing wheels to said tractor and trailer units.

7. In an earth moving vehicle of the type having tractor and trailer units, a load supporting structure positioned intermediate said tractor and trailer units comprising: a trailer hitch support; a pair of load bearing wheels rotatably mounted on said trailer hitch support; hitch means connecting said trailer hitch support to said trailer unit; a fork frame having a pedestal portion pivotally connected to said tractor unit for horizontally swinging movement relative to said tractor unit, and having a pair of branches extending from said pedestal portion, said branches each pivotally connected to said trailer hitch support for vertical swinging movement about a transverse axis, a lever arm disposed between said branches having one end pivotally connected to said trailer hitch support for pivotal movement to an abutting position with said trailer hitch support; and power means disposed between said branches and connected to said pedestal and said lever arm, said power means upon actuation moving said lever arm to said abutting position for pivoting said trailer hitch support relative to said fork frame about said transverse axis and being effective to transfer weight from said load bearing wheels to said tractor and trailer units.

8. In an earth moving vehicle of the type having tractor and trailer units, a load supporting structure positioned intermediate said tractor and trailer units comprising: a trailer hitch support; a pair of load bearing wheels rotatably mounted on said trailer hitch support; hitch means connecting said trailer hitch support to said trailer unit; a frame having a pedestal portion pivotally connected to said tractor unit for horizontally swinging movement relative to said tractor unit and having a pair of branches extending from said pedestal portion, said branches each pivotally connected to said trailer hitch support for vertical swinging movement about a transverse axis; a lever arm disposed between said branches having one end pivotally connected to said trailer hitch support for pivotal movement about said transverse axis to an abutting position with said trailer hitch support; and a hydraulic ram disposed between said branches having one end pivotally connected to said pedestal and its other end pivotally connected to said lever arm, said hydraulic ram upon actuation moving said lever arm to said abutting position for pivoting said trailer hitch support relative to said fork frame about said transverse axis and being effective to transfer weight from said load bearing wheels to said tractor and trailer units.

References Cited in the file of this patent

UNITED STATES PATENTS

| | | |
|---|---|---|
| 2,360,902 | Simmons | Oct. 24, 1944 |
| 2,368,202 | Clark | Jan. 30, 1945 |
| 2,828,142 | Hamblin | Mar. 25, 1958 |